(12) United States Patent
Lin et al.

(10) Patent No.: US 9,819,496 B2
(45) Date of Patent: Nov. 14, 2017

(54) METHOD AND SYSTEM FOR PROTECTING ROOT CA CERTIFICATE IN A VIRTUALIZATION ENVIRONMENT

(71) Applicants: INSTITUTE OF INFORMATION ENGINEERING, CHINESE ACADEMY OF SCIENCES, Beijing (CN); DATA ASSURANCE&COMMUNICATION SECURITY CENTER, CHINESE ACADEMY OF SCIENCES, Beijing (CN)

(72) Inventors: Jingqiang Lin, Beijing (CN); Jiwu Jing, Beijing (CN); Le Guan, Beijing (CN); Bingyu Li, Beijing (CN); Jing Wang, Beijing (CN); Wuqiong Pan, Beijing (CN); Yuewu Wang, Beijing (CN)

(73) Assignees: Institute of Information Engineering, Chinese Academy of Sciences, Beijing (CN); Data Assurance & Communications Security Center, Chinese Academy of Sciences, Beijing (CN)

( * ) Notice: Subject to any disclaimer, the term of this patent is extended or adjusted under 35 U.S.C. 154(b) by 0 days.

(21) Appl. No.: 14/908,261

(22) PCT Filed: Jan. 16, 2015

(86) PCT No.: PCT/CN2015/070865
§ 371 (c)(1),
(2) Date: Jan. 28, 2016

(87) PCT Pub. No.: WO2016/106867
PCT Pub. Date: Jul. 7, 2016

(65) Prior Publication Data
US 2017/0295024 A1  Oct. 12, 2017

(30) Foreign Application Priority Data
Dec. 29, 2014 (CN) .......................... 2014 1 8491251

(51) Int. Cl.
*H04L 29/06* (2006.01)
*H04L 9/32* (2006.01)
*G06F 9/455* (2006.01)

(52) U.S. Cl.
CPC ........ *H04L 9/3263* (2013.01); *G06F 9/45504* (2013.01); *H04L 9/32* (2013.01);
(Continued)

(58) Field of Classification Search
CPC ..................................................... H04L 9/3263
See application file for complete search history.

(56) References Cited

U.S. PATENT DOCUMENTS 7,571,312 B2 * 8/2009 Scarlata .................. G06F 21/53
713/155
8,074,262 B2 * 12/2011 Scarlata .................. G06F 21/53
726/4

(Continued)

OTHER PUBLICATIONS

Paul et al, Xen and the art of virtualization, 2003, ACM, vol. 37 Issue 5, Dec. 2003 pp. 164-177.*

*Primary Examiner* — Ali Shayanfar
(74) *Attorney, Agent, or Firm* — SV Patent Service

(57) ABSTRACT

The present invention discloses a method and a system for protecting root CA certificates in a virtualization environment. The method installs a root CA certificate security manager on a host computer. The root CA certificate security manager stores the lists of root CA certificates and provides certificate validation service to virtual machines via a read-only interface. When a virtual machine needs the verification of a certificate, it sends a certificate validation service request to the root CA security manager. The root CA certificate security manager provides certificate validation services to the virtual machine in response to the request. The virtual list of root CA certificates in the present invention has the following features: it isolates the list of the root CA certificates from the virtual machine; the virtual machine can only access the list of the root CA certificates in a read-only manner; modification or configuration of the lists of root CA certificates can only be made via an interface of the CA certificate security manager on the host computer; and the virtual machine can flexibly choose the way how a certificate is to be verified.

5 Claims, 2 Drawing Sheets

(52) U.S. Cl.
CPC .......... *H04L 29/06* (2013.01); *H04L 63/0823* (2013.01); *H04L 63/20* (2013.01)

(56) References Cited

U.S. PATENT DOCUMENTS

| | | | | |
|---|---|---|---|---|
| 2006/0256108 | A1* | 11/2006 | Scaralata | G06F 21/57 345/418 |
| 2007/0156860 | A1* | 7/2007 | Nedelcu | H04L 41/12 709/220 |
| 2008/0320594 | A1* | 12/2008 | Jiang | G06F 21/566 726/24 |
| 2010/0024016 | A1* | 1/2010 | Violleau | G06F 21/335 726/7 |
| 2011/0219447 | A1* | 9/2011 | Horovitz | G06F 9/45533 726/22 |
| 2012/0079596 | A1* | 3/2012 | Thomas | G06F 21/55 726/24 |
| 2013/0061047 | A1* | 3/2013 | Sridharan | H04L 45/586 713/162 |
| 2014/0115675 | A1* | 4/2014 | Jung | H04L 63/0853 726/6 |
| 2014/0380042 | A1* | 12/2014 | Hanka | H04L 9/3263 713/158 |
| 2015/0058931 | A1* | 2/2015 | Miu | H04L 63/126 726/3 |
| 2016/0188350 | A1* | 6/2016 | Shah | G09C 1/00 717/148 |

* cited by examiner

METHOD AND SYSTEM FOR PROTECTING ROOT CA CERTIFICATE IN A VIRTUALIZATION ENVIRONMENT

TECHNICAL FIELD

The present invention belongs to the field of computer security, and in particular to a method and a system for the protection of the root CA certificate in a virtualization environment.

BACKGROUND OF THE INVENTION

Public Key Infrastructure (PKI) is based on public-key cryptography, mainly for solving the issue of key certification, that is, to whom the private key belongs. The emergence of public-key cryptography technology theoretically provides security guarantees to digital signatures in computer networks. PKI is implemented with the signing of digital certificates by CA (Certification Authority), which provides key certification service and publishes the owner's information of the public key.

CA is a third party responsible for signing digital certificates, which is an entity trusted by both parties in communication based on PKI systems. A digital certificate (or simply referred to as certificate) binds public key and the owner's identity of the corresponding private key, by CA's digital signature (or simply referred to as signature). CA's signature is to ensure that any change to a digital certificate will lead to failures in validation of the certificate. A certificate also contains the CA's name and other information, which allows users to find the CA's public key to validate the digital signature on the certificate.

The process of signing a digital certificate is hierarchical. The uppermost CA, or referred to as the root CA, and is responsible for signing a certificate to a subordinate CA. The subordinate CA can also sign certificates to lower CAs subsequently, until the CAs at the bottom use their private keys to sign digital certificates to subscribers. In this process, all the intermediate CAs (or simply referred to as sub CAs) have a CA certificate signed by a superior CA, which is the same as that of the subscribers. The uppermost root CA has a self-signed certificate, referred to as a self-signed certificate of root CA, or simply as a root CA certificate. The root CA certificate includes the public key and the identity of the root CA; the associated digital signature is generated using the root CA's own private key. The root CA certificate and the certificates at other layers together form a certificate chain. A certificate chain can have only two layers, in which case the root CA directly signs digital certificates to a subscriber.

In order to verify that the information in a digital certificate has not been maliciously tampered with, and correctly obtain the communication peer's public key, a PKI user needs to conduct the following steps. (1) Firstly, it securely obtains a self-signed root CA certificate from the root CA, and makes sure that the transfer process has not been tampered with, and installs the root CA certificate on the user's computer system. (2) It verifies the certificates in certificate chain one by one. It checks the validity of current digital certificate, such as validity period (and its revocation status, certificate extensions, etc.). It then obtains the digital certificate of the issuer who signed the current digital certificate, views the certificate issuer's information after obtaining the certificate of the issuer; and then obtains the digital certificate of the issuer at the next higher layer, thus obtains certificates one by one. (3) The above steps are repeated until a root CA certificate is obtained. Because it is a self-signed certificate, the root CA certificate does not need to be verified by other certificates. User simply checks the validity period of the root CA certificate. (4) User uses the public key in the root CA certificate to verify the signature of its subordinate CA certificate to make sure that the certificate has not been tampered with, and checks validity of the subordinate CA certificate, such as its validity period (and revocation status, certificate extensions, etc.). It then reads the public key from the subordinate CA certificate. (5) User repeats the same step above to verify the signature of the certificate at its next layer, and checks if the digital certificate is valid. The process is repeated until that all digital certificates of the communication peer are verified, that the public key data is read from the certificate, and that the public key of the certificate holder is confirmed. At this point the PKI user can use the public key of the digital certificate of the communication partner to encrypt communication content and verify digital signature.

In above steps of verifying digital certificates, all certificates of intermediate CAs and communication partner are verified by their superior CAs' public keys and are ensured to be free of tampering. Only the root CA certificate, as a self-signed certificate, is not verified at the starting point of the process using other reliable data. Once a user chooses to trust the root CA certificate, all certificates signed by the private key of the root CA will be trusted. Thus, root CA certificate must be obtained using a reliable and trustworthy method, and should be properly stored on the user's computer, to prevent it from being replaced or added maliciously. Otherwise, it may cause harm to users. For example, if a malicious attacker had inserted a self-signed certificate into a user's list of root CA certificates, the attacker could then attack the user. If the user visited a phishing site using the fake inserted root CA certificate, the user would trust the phishing site after the site is authenticated by the maliciously inserted root CA certificate. The user's personal information such as account and password could be stolen by the phishing site.

In existing operating systems such as Windows, the list of root CA certificates is maintained by operating system. To install a root CA certificate requires user's consent. However, in many cases, users do not understand the impact of adding a root CA certificate and may agree with adding a root CA certificate at will. In practice, a root CA certificate could be forged and maliciously inserted or used, for various reasons such as CA administrator's negligence, improper software implementation, and penetration attacks. In fact, while a user is unaware of that, a malicious third party could stealthily add a malicious root CA certificate, through several kinds of methods such as virus, Trojan horse, and even simple script. If a malicious root CA certificate were successfully added, all digital signatures that could be verified by any certificate chains starting from the root CA certificate would be trusted, which would be, for example, a digital signature of malicious code requested to be installed on user's computer or a digital certificate initiated by a malicious peer to communicate with user. At this time, malicious codes could attack user's computer, such as stealing private data and disguising the identity of a malicious party as others the user communicates with, etc. These attacks can cause great harm to user. Thus, the security of root CA certificates is particularly important.

Virtualization technology has been widely used since AMD and Intel had launched products supporting hardware virtualization in succession. Using virtualization, enterprises can reduce cost of capital and office space requirement, and improve availability, flexibility and security of business. Virtualization technology enables users to run multiple guest virtual machines (or referred to as virtual machines or VMs) on a physical computer, wherein the physical computer is called the host.

Virtualization technology isolates user's virtual machines, providing software separation at another level. Even when a particular virtual machine is exposed to attacks and infection from the Internet, the security of the virtualization platform is not threatened, let alone other virtual machines. Virtualization platform includes an important component: the virtual machine monitor (VMM). Its main role is to manage the resources on the host and to enable virtual machines running on the host sharing the same set of host resources.

SUMMARY OF THE INVENTION

The present invention provides a method and a system for protecting root CA certificates in a virtualization environment. A root CA certificate security manager manages available resources of root CA certificates on the host machine, and controls access of each virtual machine to the list of root CA certificates. The root CA certificate security manager is outside of virtual machines, manages and examines certificate validation requests from virtual machines as a virtual device.

The root CA certificate security manager in the present invention can be implemented in virtualization platform based on Xen, or based on VMware ESX/ESXi, or based on Hyper-V, or based on KVM-QEMU.

The present invention uses the root CA certificate security manager to provide certificate validation service to virtual machines in a virtualization environment. Lists of root CA certificates are stored in the root CA certificate security manager. The virtual machines no longer store their lists of root CA certificates. The virtual machines can obtain the lists of root CA certificates in a read-only manner via the root CA certificate security manager.

The lists of root CA certificates can only be configured upon the root CA certificate security manager via the interfaces provided by the host. The root CA Certificate security manager is running in VMM.

The present invention has made the lists of root CA certificates as part of virtualized resources, to provide certificate validation service to virtual machines in a virtualization environment. The list of root CA certificates above appears to be a standard list of root CA certificates in the sight of a virtual machine, but is managed by the root CA certificate security manager. The root CA certificate security manager includes a folder in which a configuration file is stored for each virtual machine to manage and configure the list of root CA certificates which the virtual machine may access.

The present invention provides certificate validation service to virtual machines in either of two following modes: certificate verification service and root CA certificates query service. Given the certificate verification service, a virtual machine can choose to request the root CA certificate security manager to verify a certificate, e.g. a subscriber's or server's certificate. In that case, the virtual machine provides the information about the certificate to be verified to the root CA certificate security manager. The root CA certificate security manager then returns the verification result to the virtual machine. Alternatively, given the root CA certificates query service, a virtual machine can choose to merely request the root CA certificate security manager to return a required root CA certificate. The root CA certificate security manager then sends the root CA certificate to the virtual machine. The virtual machine obtains the required root CA certificate in a read-only manner, and then completes the certificate verification on its own.

Before the virtual machine requests certificate validation service from the root CA certificate security manager, it needs to provide the distinguished name of the related root CA certificate issuer (that is, the Issuer field in the X.509 root CA certificate; for a root CA certificate, the Issuer field is equal to the Subject field), or the subject key identifier (i.e. the SubjectKeyIdentifier extension field in the X.509 root CA certificate). The root CA certificate security manager searches for the root CA certificate that meets the conditions in the request, by querying the configuration file associated with the virtual machine. If such a root CA certificate is found, the root CA certificate security manager provides certificate validation service using the corresponding root CA certificate in the configuration file according to certificate validation service mode chosen by the virtual machine. If not, the request for certificate validation service from the virtual machine is terminated.

The root CA certificate serves as a virtual device and does not appear on virtual machines in certificate validation service. When a virtual machine requires certificate validation service, it sends a request to the root CA certificate security manager via a communication channel between the virtual machine and the root CA certificate security manager. The root CA certificate security manager provides the corresponding service to the virtual machine in a read-only manner. Moreover, the operating system of virtual machines can only read root CA certificates from the root CA certificate security manager. The root CA certificate security manager does not provide interface for modifying root CA certificates to virtual machines. Thus, even if the operating system of virtual machines were compromised, the list of root CA certificates could still not be tampered with.

The root CA certificate security manager disclosed in the present invention has the following characteristics:

a) It provides certificate validation service to virtual machines through a read-only interface;

b) It isolates the lists of root CA certificates from virtual machines for centralized management;

c) The virtual machines can only access to the list of root CA certificates in a read-only manner, and all configuration changes to the root CA certificates can only be achieved upon the host machine by an interface to the root CA certificate security manager; and d) The virtual machine has flexibility to choose how a certificate is verified. The virtual machine can choose to request the root CA certificate security manager to accomplish the certificate verification. The virtual machine can also request the root CA certificate security manager to provide the required root CA certificate.

In this structure, the root CA certificate security manager has the following advantages:

1) It guarantees the security of the root CA certificate list. Because the root CA certificate list is stored in the host, it can only be configured via a specific interface, preventing the list of root CA certificates from being easily altered, thus avoiding many types of attacks in existing systems.

2) It can keep the configuration of the list of root CA certificates consistent within a certain scope (for example, all virtual desktops within an enterprise). That is, multiple virtual machines running on the same VMM can use the same list of root CA certificates, leading to the same trust domain of these virtual machines.

3) It simplifies the configuration and the management of the root CA certificate list. The virtual machines no longer need to configure their lists of root CA certificates separately, instead only need to configure them at one time by the root CA certificate security manager in the lower-level. The root CA certificate manager resides in the host, and can configure the root CA certificate security manager via an interface.

Additionally, the virtual machine can request the root CA certificate security manager to verify a server's certificate, which guarantees the security of the procedure and the result of certificate verification.

Because attacks and intrusions to virtual machines will not be transferred to the root CA certificate security manager, the root CA certificate security manager can reliably accomplish the verification and transfer the result to the virtual machine through the secure virtual channel. The virtual machine can determine the validity of the certificate based on the result returned. When the virtual machine chooses to verify a certificate on its own, it sends a request to the root CA certificate security manager. The root CA certificate security manager sends the requested root CA certificate information to the virtual machine through established secure virtual communication channel; the virtual machine subsequently completes the certificate verification process on its own.

DETAILED DESCRIPTION OF THE INVENTION

In order to make objects, features, and advantages of the present invention mentioned above more easily understood, the present invention is further described below based on the embodiments and the drawings.

Figure 1:
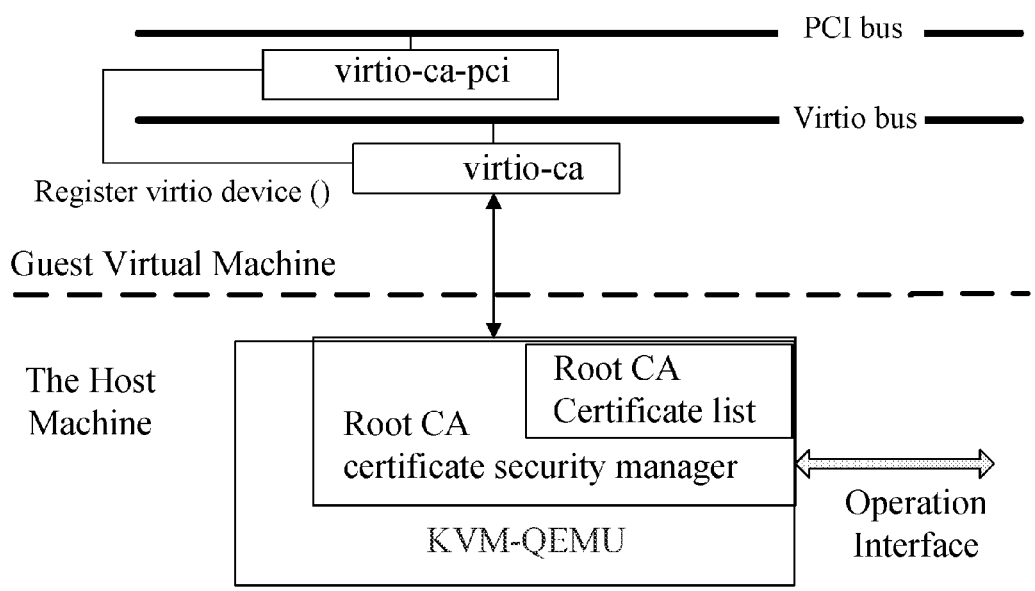
FIG. 1 is a schematic diagram for providing certificate validation service in an embodiment.

FIG. 1 is an illustration of a present disclosed method for providing a root CA certificate security management services in a virtualization environment. The list of root CA certificates is stored in the root CA certificate security manager. The root CA certificate security manager can run in KVM-QEMU and has a user interface provided by the QEMU. The configuration of the root CA certificate security manager, such as adding or deleting root CA certificates, can be directly achieved by calling functions of the host machine. After the virtual machine submits a request for certificate validation service and selects a mode for the certificate validation, the root CA certificate security manager responds to the request, and provides certificate validation service according to the mode selected by the virtual machine. The root CA certificate security manager can provide a read-only interface to the virtual machine via VMM. The virtual machine can read the information of a certain root CA certificate or access the interface for certificate verification. The root CA certificate security manager provides corresponding services to the virtual machine to its request through the interface according: delivering the required root CA certificate information for certificate verification via a read-only interface to the virtual machine, or accomplishing the requested certificate verification and returning result via the interface.

In the present embodiment, the root CA certificate security manager can be implemented in KVM-QEMU virtualization platform. Its configuration interface is integrated in the QEMU console and provides an interface to administrator, allowing the administrator to directly configure the root CA certificate list in the host. KVM is a Linux kernel module, and is the core of the KVM-QEMU virtualization platform. It initializes the processor, and offers a series of VMM management interfaces via ioctl system calls, including creating VM, VM physical address mapping, assigning VM virtual CPU (vCPU), and so on. QEMU process provides an emulator for the virtual machine, and calls the KVM interface to run virtual machine program. The function of the KVM module is mainly to capture the virtual machine IO instructions (including Port IO and mmap IO) and to terminate virtualization, by operating Virtual-Machine Control Data Structure (VMCS).

Figure 2:
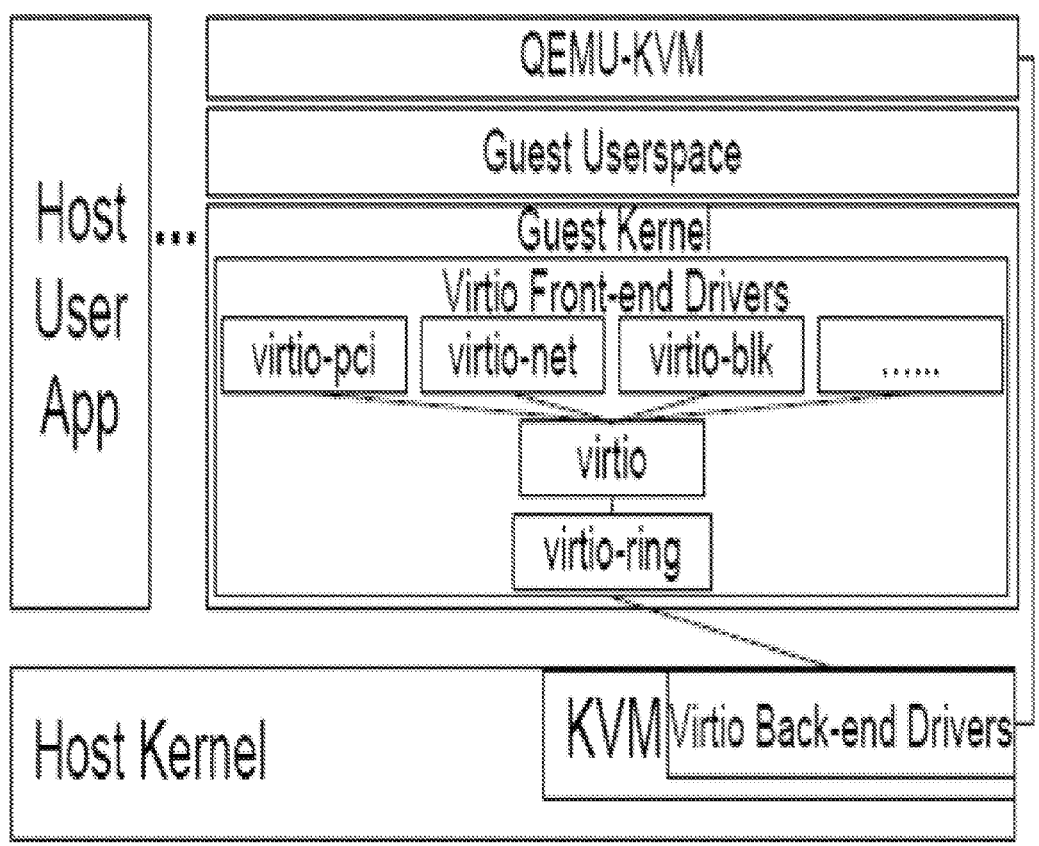
FIG. 2 is a schematic diagram of the Virtio system in an embodiment.

In the present embodiment, the request for certificate validation and the result, transferred between the root CA certificate security manager and the virtual machine, are conducted using Virtio. The framework of Virtio is shown in FIG. 2.

In the present embodiment, the front-end driver (such as virtio-blk, virtio-net, etc.) is in the driver module of the virtual machine, while the back-end processing program (back-end driver) is implemented in QEMU. In this implementation, virtio-ca is the front-end driver. Virtio-ca is a virtual root CA certificate equipment whose main purpose is to guarantee that the root CA certificate list cannot be directly accessed by the virtual machine in the digital certificate validation process. The back-end processing program is achieved by the root CA certificate security manager. It either provides the information needed in the root CA certificate request, or accomplishes and returns the results of the digital certificate verification.

Between the front-end and the back-end, two extra layers are defined to support communication between virtual machines and QEMU. Wherein, the virtio layer is the virtual queue (virtqueues) interface, which conceptually attaches a front-end driver to the back-end processing program. By calling virtio-ring in the lower level, the virtual queue enables the front-end driver and the back-end processing program to send and receive data with each other using the same Application Binary Interface (ABI), thus providing a communication channel between the two sides. Therefore, the virtual queue is considered as the joint between the virtual machines and VMM. In the present embodiment, virtio-ca instantiates a pair of virtual queues (virtqueues) during initialization, to be used for delivering messages in certificate validation service.

The virtio-ring layer implements a ring buffer to store information from the front-end driver and the back-end processing program. It can store multiple I/O requests from the front-end driver in bulk, and send them to the back-end together for batch processing. In the present example, the virtual machine dynamically requests memory, and allocates the address to the root CA certificate security manager via the PCI interface. The root CA certificate security manager adds an offset to obtain the virtual address in memory. Both sides communicate with each other via the shared memory area.

In this embodiment, the root CA certificate security manager is driven by virtio-ca, which is recognized by a guest operating system using the PCI interface. When a virtual machine attached to the root CA certificate security manager startups, the probe function of the virtio-ca-pci is triggered, and registers to virtio-ca via register_virtio_driver, indicating that virtio-ca is now associated with the root CA certificate security manager. Virtio-ca has now established a communication channel with the root CA certificate security manager. The virtual machine can use virtio-ca to send a request message to the root CA security manager and to accept the response information from the root CA certificate security manager. Virtio-ca-pci option should be added into QEMU start command to enable the virtual machine to identify the root CA certificate security manager.

The request for certificate validation service from a virtual machine to the root CA certificate security manager includes the following steps:

a) The virtual machine provides the related root CA certificate issuer's name to the root CA certificate security manager via virtio-ca (i.e. the Issuer field in the X.509 root CA certificate; for the root CA certificate, the Issuer field is the same as the Subject field), or the subject key identifier (i.e. The X.509 root CA certificate SubjectKeyIdentifier extension field).

b) The root CA certificate security manager searches for the root CA certificate that meets the conditions in the request, by querying the configuration file associated with the virtual machine.

c) If a root CA certificate that meets the conditions of the certificate issuer's name or the subject key identifier is found in the configuration file associated with the virtual machine, the root CA certificate security manager accesses the folder of the list of root CA certificates, and reads the certificate issuer's name or the subject key identifier in sequence therein, to find the root CA certificate that satisfies the request conditions of the virtual machine, then proceed step d). If not, the root CA certificate security manager terminates the request for certificate validation service from the virtual machine.

d) After the root CA certificate that meets the conditions has been found, based on the certificate validation mode selected by the virtual machine, the following steps are performed:

When the virtual machine requests the root CA certificate security manager to conduct the certificate verification, the root CA certificate security manager sends a request to the virtual machine via virtio-ca, and asks the virtual machine to send the information of the certificate to be verified. The virtual machine returns the information of the certificate to be verified to the root CA certificate security manager through virtio-ca. The root CA certificate security manager verifies the digital signature in the certificate using the public key in corresponding root CA certificate, and returns the verification result to the virtual machine via virtio-ca.

When the virtual machine requests the root CA certificate security manager to provide information about the root CA certificate required, the root CA certificate security manager sends the corresponding information about the root CA certificate to the virtual machine via virtio-ca. The virtual machine independently completes the verification process.

The foregoing description of the embodiment is provided for illustration only, rather than for the purpose of limiting, the technical solutions of the present invention. One of ordinary skill in the art may modify or vary the exemplary embodiment without departing from the spirit and scope of the present invention. The scope of the present invention should be subject to the claims.

What is claimed is:

1. A method for protecting root Certificate Authority certificate in a virtualization environment, comprising:

1) installing a root Certificate Authority certificate security manager on a host computer; operating the root Certificate Authority certificate security manager in a virtual machine monitor on the host computer; storing lists of root Certificate Authority certificates in the root Certificate Authority certificate security manager; providing certificate validation service to virtual machines by the root Certificate Authority certificate security manager via a read-only interface to virtual machines in a virtualization environment; accessing the lists of root Certificate Authority certificates in the root Certificate Authority certificate security manager by the virtual machine via the read-only interface; and 2) sending a service request from the virtual machine to the root Certificate Authority certificate security manager when the virtual machine needs verification of a certificate; providing certificate validation service for the certificate by the root Certificate Authority certificate security manager in response to the service request, wherein the step of providing certificate validation service by the root Certificate Authority certificate security manager comprises the following steps:

a) when the virtual machine requests the root Certificate Authority certificate security manager to verify a certificate, verifying the certificate received from the virtual machine by the root Certificate Authority certificates security manager using the root Certificate Authority certificate list corresponding to the virtual machine: returning a result to the virtual machine via the read-only interface; and b) when the virtual machine requests to read a root Certificate Authority certificate from the root Certificate Authority certificate security manager, sending information about the root Certificate Authority certificate from the root Certificate Authority certificates security manager to the virtual machine via the read-only interface: completing the verification of the certificate by the virtual machine, wherein the lists of root Certificate Authority certificates are configured only via an interface of the root Certificate Authority certificate security manager on the host computer.

2. The method of claim 1, further comprising:

selecting a mode of certificate validation service by the virtual machine when sending a service request from the virtual machine to the root Certificate Authority certificate security manager.

3. The method of claim 1, wherein the virtual machine sends the service request for certificate validation service to the root Certificate Authority certificate security manager through a secure virtual communication channel shared with the root Certificate Authority certificate security manager.

4. A system for protecting root Certificate Authority certificates in a virtualization environment, comprising: a host computer comprising computer processor installed with a root Certificate Authority certificate security manager, wherein the root Certificate Authority certificate security manager operates in a virtual machine monitor on the host computer, wherein the root Certificate Authority certificate security manager stores lists of root Certificate Authority certificates; and a virtual machine, wherein the root Certificate Authority certificate security manager provides certificate validation service via a read-only interface to the virtual machine, wherein the virtual machine accesses the list of root Certificate Authority certificates in the root Certificate Authority certificate security manager via the read-only interface, wherein the virtual machine sends a service request for certificate validation to the root CA certificate security manager when the virtual machine needs to verify a certificate, wherein the root Certificate Authority certificate security manager provides certificate validation service for the certificate in response to the service request wherein the step of providing certificate validation service by the root Certificate Authority certificate security manager comprises the following steps:

a) when the virtual machine requests the root Certificate Authority certificate security manager to verify a certificate, verifying the certificate received from the virtual machine by the root Certificate Authority certificates security manager using the root Certificate Authority certificate list corresponding to the virtual machine: returning a result to the virtual machine via the read-only interface, and b) when the virtual machine requests to read a root Certificate Authority certificate from the root Certificate Authority certificate security manager, sending information about the root Certificate Authority certificate from the root Certificate Authority certificates security manager to the virtual machine via the read-only interface, completing the verification of the certificate by the virtual machine, wherein the lists of root Certificate Authority certificates are configured only via an interface of the root Certificate Authority certificate security manager on the host computer.

5. The system of claim 4, wherein the configuration of the lists of root Certificate Authority certificates, including adding, deleting, modifying the list of root Certificate Authority certificates used by each virtual machine, is achieved only via an interface provided by the root Certificate Authority certificate security manager.

* * * * *